7573X
H. Branch.
Thrashing Mach.
Patented May 9, 1833.
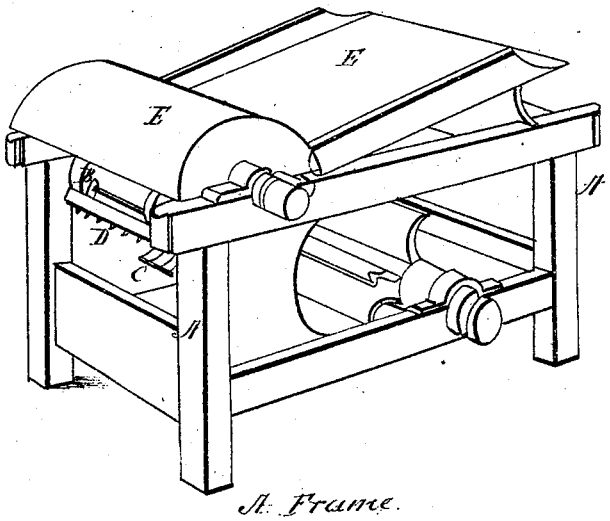
A. Frame.
B. Cylinder
C. Concave.
D. Swinging beater
E. Caps.
F. Hopper

MISSING PAGE TEMPORARY NOTICE

PATENT # 7573X FOR ISSUE DATE 5-9-1833

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All Text